US011550989B2

(12) United States Patent
Bernstein et al.

(10) Patent No.: US 11,550,989 B2
(45) Date of Patent: Jan. 10, 2023

(54) APPLICATION PROGRAMMING INTERFACE FOR BROWSING MEDIA CONTENT

(71) Applicant: Sonos, Inc., Santa Barbara, CA (US)

(72) Inventors: David Bernstein, Boston, MA (US); Konstantin Vovk, Seattle, WA (US); Lee Fyock, Boston, MA (US); Andrew Woodbury, Boston, MA (US); Emilio Arce, Cambridge, MA (US); Elliot Lawrence, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/403,638

(22) Filed: Aug. 16, 2021

(65) Prior Publication Data
US 2022/0138400 A1 May 5, 2022

Related U.S. Application Data

(63) Continuation of application No. 16/949,686, filed on Nov. 10, 2020, now Pat. No. 11,093,689.

(60) Provisional application No. 62/934,258, filed on Nov. 12, 2019.

(51) Int. Cl.
G06F 40/106 (2020.01)
(52) U.S. Cl.
CPC .................. G06F 40/106 (2020.01)
(58) Field of Classification Search
None
See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

Primary Examiner — Toan H Vu
(74) Attorney, Agent, or Firm — Akerman LLP

(57) ABSTRACT

A control application of a media playback system controls playback of media content by a media playback system. The application receives, from a media streaming service, a page object that identifies (i) a page format identifier, (ii) page content data, (iii) a set of page elements, and (iv) a respective element format identifier for each page element of the set of page elements. The application determines a first set of formatting rules using the page format identifier and displays a corresponding page that includes the page content data formatted using the first set of formatting rules. The application asynchronously receives media content data identifying media content available for streaming. Based on a respective element format identifier of the page element associated with the media content data, the application determines a second set of formatting rules, which the application uses to update the displayed page to display the media content data.

20 Claims, 14 Drawing Sheets

(56) References Cited

U.S. PATENT DOCUMENTS

| | | | |
|---|---|---|---|
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 3,014,423 A1 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 8,995,687 B2 | 3/2015 | Marino, Jr. et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2008/0052742 A1* | 2/2008 | Kopf | H04N 21/47 725/34 |
| 2009/0063974 A1 | 3/2009 | Bull et al. | |
| 2009/0169030 A1 | 7/2009 | Inohara | |
| 2010/0302189 A1 | 12/2010 | Liu | |
| 2013/0232419 A1* | 9/2013 | Yates | G06F 3/0484 715/723 |
| 2014/0009500 A1* | 1/2014 | Laine | H04N 21/42222 345/659 |
| 2014/0040285 A1* | 2/2014 | Rubinstein | G06Q 50/01 707/751 |
| 2014/0266637 A1 | 9/2014 | Alsina et al. | |
| 2014/0363024 A1 | 12/2014 | Apodaca | |
| 2015/0012363 A1* | 1/2015 | Grant | G06Q 30/0269 705/14.66 |
| 2015/0256926 A1 | 9/2015 | Kim et al. | |
| 2016/0224217 A1* | 8/2016 | Kim | G06F 3/04883 |
| 2018/0095656 A1* | 4/2018 | Ingah | H04N 21/42208 |
| 2018/0364901 A1* | 12/2018 | Fan | G06F 3/0482 |
| 2018/0371984 A1* | 12/2018 | Goldman | G06Q 30/02 |
| 2020/0021888 A1* | 1/2020 | de Mello Brandao | H04N 21/8456 |
| 2020/0374568 A1* | 11/2020 | Kalish | H04N 21/23106 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance dated Mar. 17, 2021, issued in connection with U.S. Appl. No. 16/949,686, filed Nov. 10, 2020, 10 pages.
Notice of Allowance dated Jan. 25, 2021, issued in connection with U.S. Appl. No. 16/949,686, filed Nov. 10, 2020, 10 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

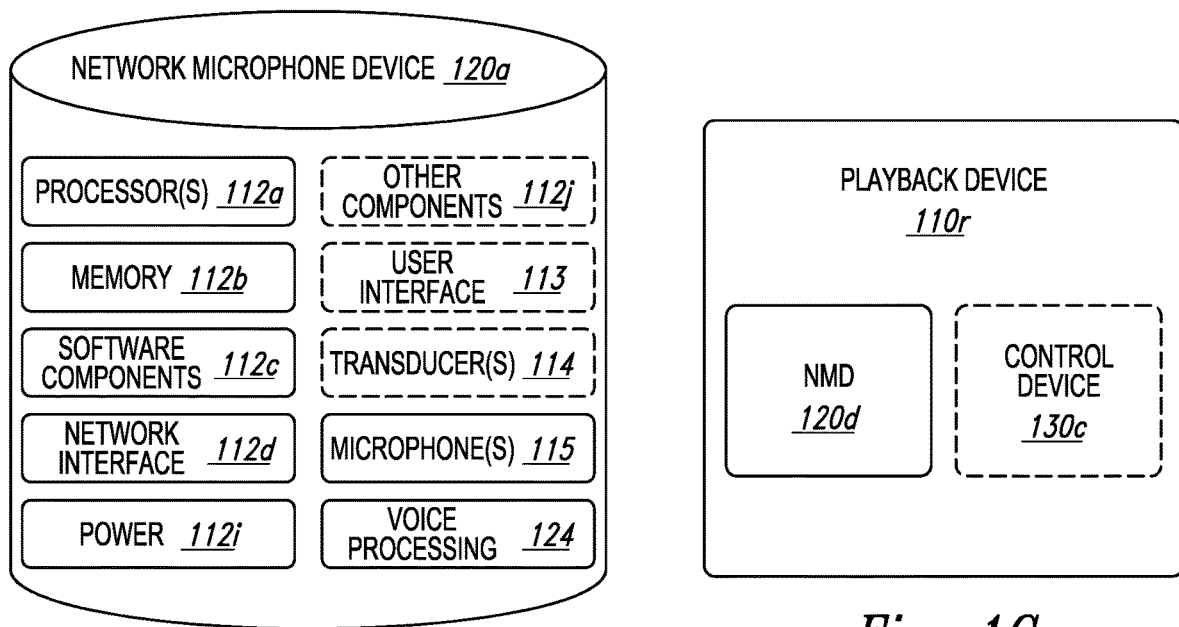
*Fig. 1F*
*Fig. 1G*
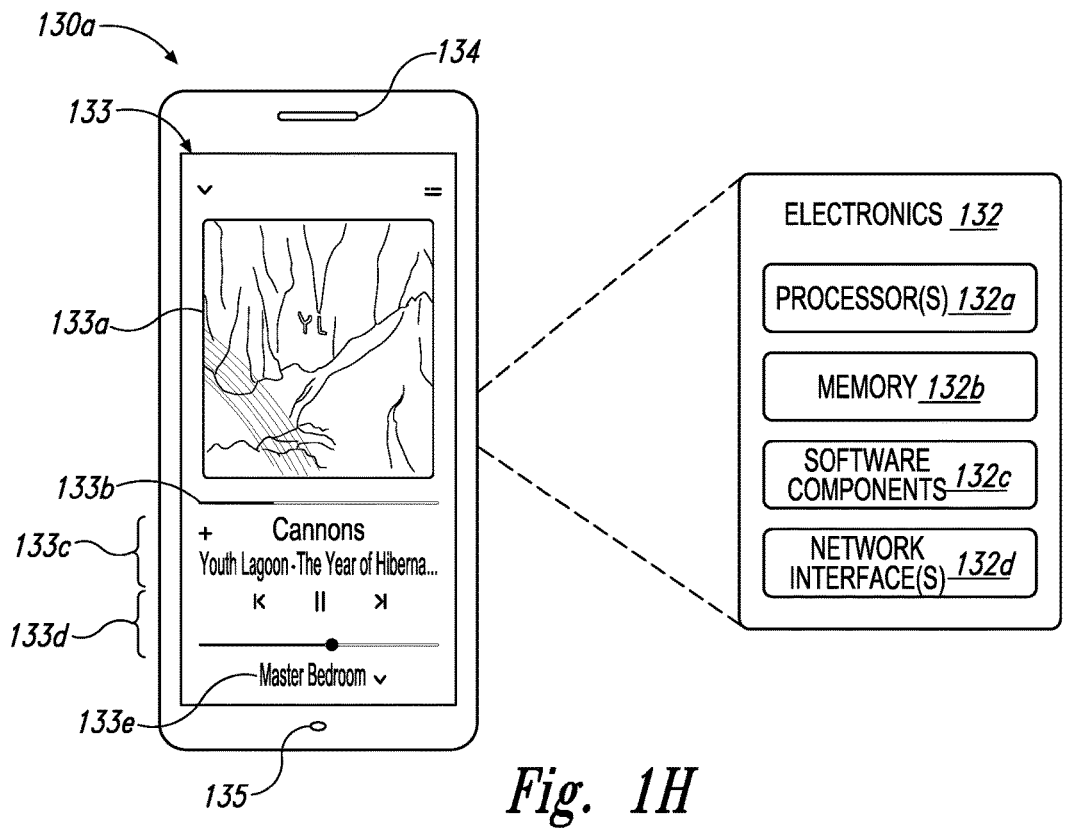
*Fig. 1H*

```
610

{
    "id":   {
       "objectId": "browse:page:rootBrowse"
    },                                              612
    "displayType": "rootBrowsePage",
                                                614
    "content":    {
       "container": {
          "name": "Spotify",              616
          "type": "container"
       }
    },
                        ⋮
         (insert View and Item code here)
                        ⋮
}
```

```
"total": 10,  ⟵
"views": [      622
  {
    "id": {
       "objectId": "browse:view:rootView1"  ⟵
    },                                            624
    "displayType": "rootBrowseView",  ⟵
  "content": {                              626
    "container": {
       "name": "Made for you",   ⎫
       "type": "container"       ⎬ 628
    }                            ⎭
  }
  },
    "refresh": {                                              ⎫
       "expirationSeconds": 3600,                             ⎬ 630
       "uri": "/v1/browse/view/browse:view:rootView1"         ⎭
    }
                        ⋮
       (insert Item code for rootView1 here)
                        ⋮
  },
                        ⋮
       (insert remaining View and Item code here)
                        ⋮
]
```

*Fig. 6B*

```
640
"total": 5,     642
"items": [
    {
        "id": {
            "objectId": "browse:item:rootItem1"      644
        },
        "displayType": "albumItem",         646
            "content": {
                "container": {
                    "type": "album",
                    "name": "Daily Mix 1",                          648
                    "artist": {
                        "name": "Fleetwood Mac, Harry
                                Nilsson, and more"
                    }
                }
            }
    },
    {
        "id": {
            "objectId": "browse:item:rootItem2"
        },
        "displayType": "albumItem",
            "content": {
                "container": {
                    "type": "album",
                    "name": "Daily Mix 2",
                    "artist": {
                        "name": "The Yardbirds, Derek &
                                The Dominos, and more"
                    }
                }
            }
    },
                        ⋮
            (insert remaining Item code here)
                        ⋮
]
```

```xml
<?xml version='1.0' encoding ='UTF-8'?>
<Presentation>
    <PresentationMap type="DisplayType">
        <DisplayType id="rootBrowsePage">
            <Lines>
                <Line token="#container.name" />
            </Lines>
        </DisplayType>
        <DisplayType id="rootBrowseView">
            <Lines>
                <Line token="#container.name" />
            </Lines>
        </DisplayType>
        <DisplayType id="albumItem">
            <Lines>
                <Line token="#container.name" />
                <Line token="#container.artist.name" />
            </Lines>
        </DisplayType>
    </PresentationMap>
</Presentation>
```

APPLICATION PROGRAMMING INTERFACE FOR BROWSING MEDIA CONTENT

CROSS-REFERENCE TO RELATED APPLICATION

This application is a continuation of U.S. application Ser. No. 16/949,686 titled "Application Programming Interface for Browsing Media Content," filed on Nov. 10, 2020 and; U.S. application Ser. No. 16/949,686 claims the benefit under 35 U.S.C. § 119 of U.S. Provisional App. 62/934,258, filed on Nov. 12, 2019. The entire contents of U.S. application Ser. No. 16/949,686 and 62/934,258 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIG. 6A is a portion of code for defining a browse page.

FIG. 6B is a portion of code for defining view objects to be displayed on a browse page.

FIG. 6C is a portion of code for defining item objects to be displayed within view objects of a browse page.

FIG. 7 is a portion of code from a formatting configuration file.

Figure 1A:
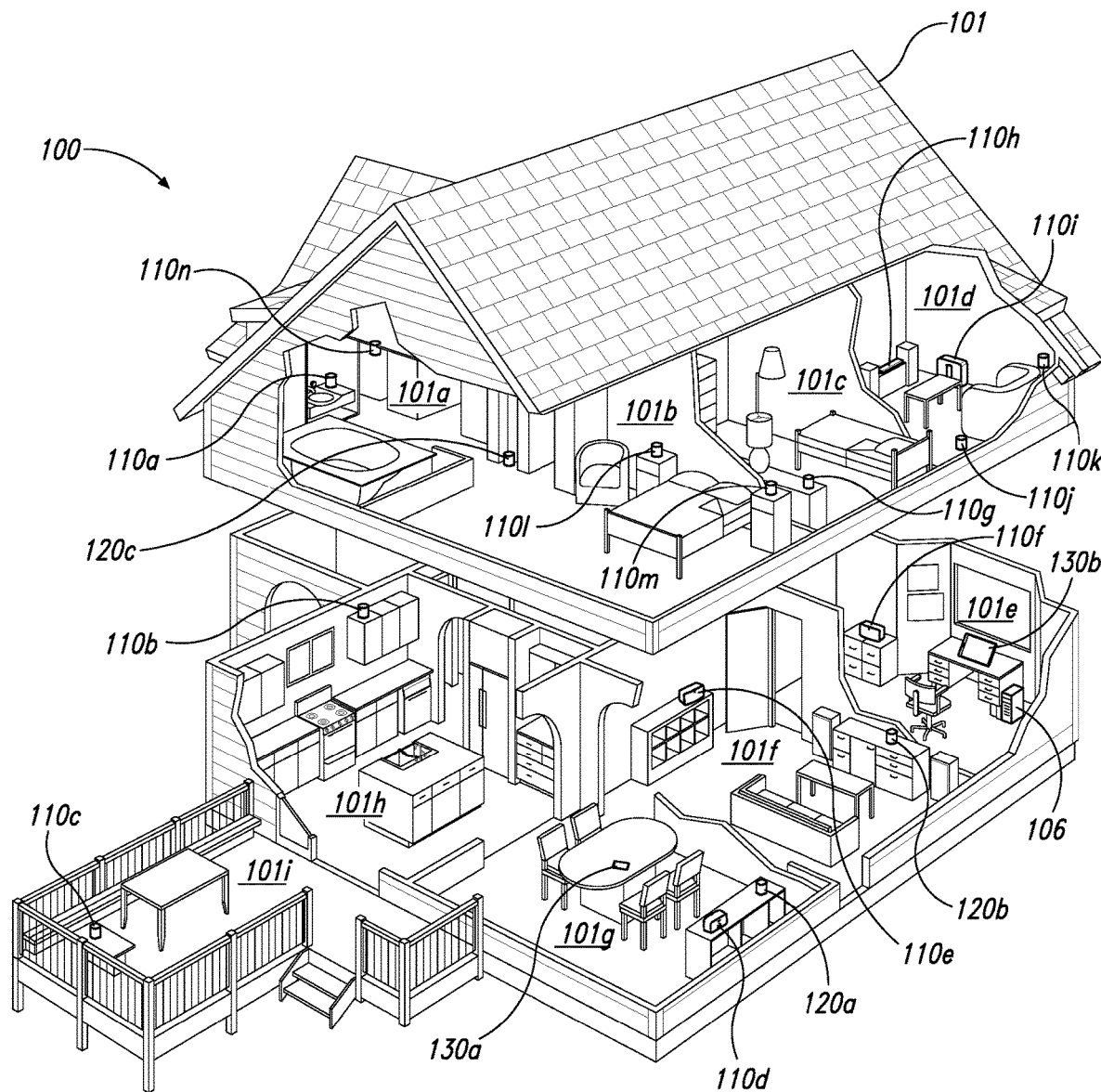
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to systems and methods for, among other things, providing graphical displays for browsing streamable media content available for playback by one or more networked playback devices of a media playback system.

A control device can use a control application to control playback of media content by the media playback system. The control device can take various forms, such as a smartphone, tablet, computer, or another suitable device on which the control application software is installed. The control application can display a control interface on a graphical display of the control device, and a user can interact with the control interface to select media content for playback by the media playback system.

In some examples, the control application can allow for streaming of media content from a media streaming service, such as Spotify, Radio by Tunein, Apple Music, Pandora, Amazon, or the like. To facilitate this, the control application and the streaming service can communicate using an application programming interface (API) for browsing the media offered by the streaming service and for playing back the media.

Given the vast amount of media available for streaming from various streaming services, one challenge with designing an API for this purpose is managing the amount of data transferred between the control application and the streaming service. For example, when identifying media content available for streaming from a particular streaming service, the control application can request and receive metadata associated with a significant number of media content items in order to present this information to a user for browsing. Further, this problem can be exacerbated if the control application repeatedly sends subsequent requests for the same metadata in order to ensure that the metadata is up to date.

Another challenge with designing an API for this purpose is to design an API that allows for some customization for the streaming service to control the manner in which its media content is ultimately displayed to an end user by the control application.

The present disclosure helps address these or other issues by providing an API for browsing streamable media content from a streaming service while reducing the amount of data transferred between the streaming service and the control application and while providing the streaming service with some control over how its streamable media content is presented to an end user.

To facilitate this, the API disclosed herein allows the control application to receive and process subsets of data, rather than the entire amount of data that the control application would otherwise receive and process for display to an end user. Further, the API allows for the data to be arranged in a hierarchical tier format that allows the streaming service to specify separate formatting rules for different tiers and for different data within the same tier.

In some embodiments, for example, a control application of a media playback system displays a control interface on a graphical display, the control interface comprising one or more controls to control playback of media content by one or more networked playback devices of the media playback system. The control application receives a page object from a media streaming service, wherein the page object identifies (i) a page format identifier, (ii) page content data, (iii) a set of page elements, and (iv) a respective element format identifier for each page element of the set of page elements. Based on the page format identifier, the control application determines a first set of formatting rules. The control application displays, on the graphical display, a page corresponding to the page object, wherein the displayed page comprises the page content data formatted according to the first set of formatting rules. The control application further receives media content data associated with a particular page element of the set of page elements, wherein the media content data identifies media content available for streaming from the media streaming service, and wherein the controller application receives the media content data asynchronously from the page object. Based on the respective element format identifier, the control application determines a second set of formatting rules. And the control application updates the displayed page to display the media content data formatted on the page according to the second set of formatting rules.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-4.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
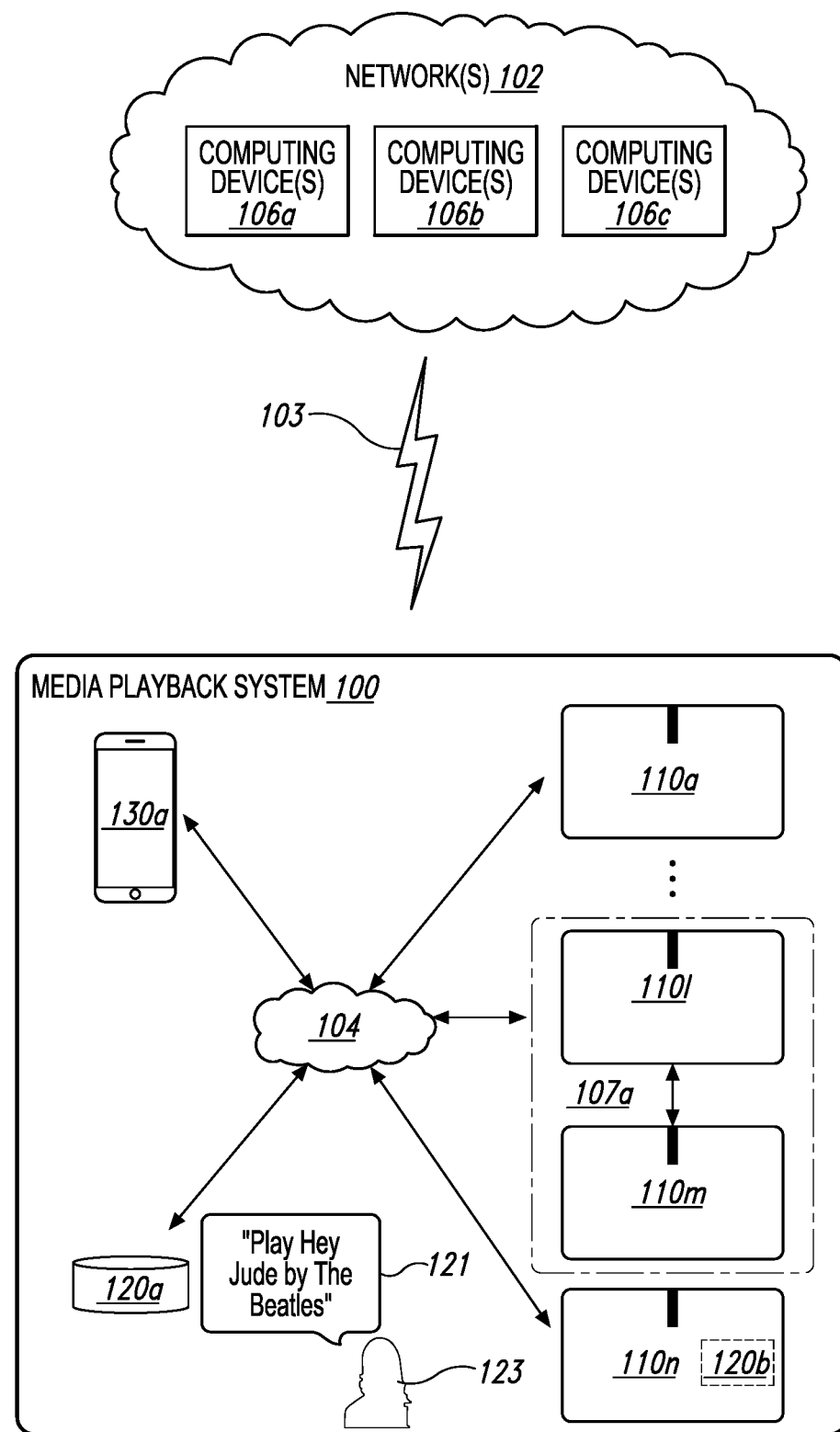
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
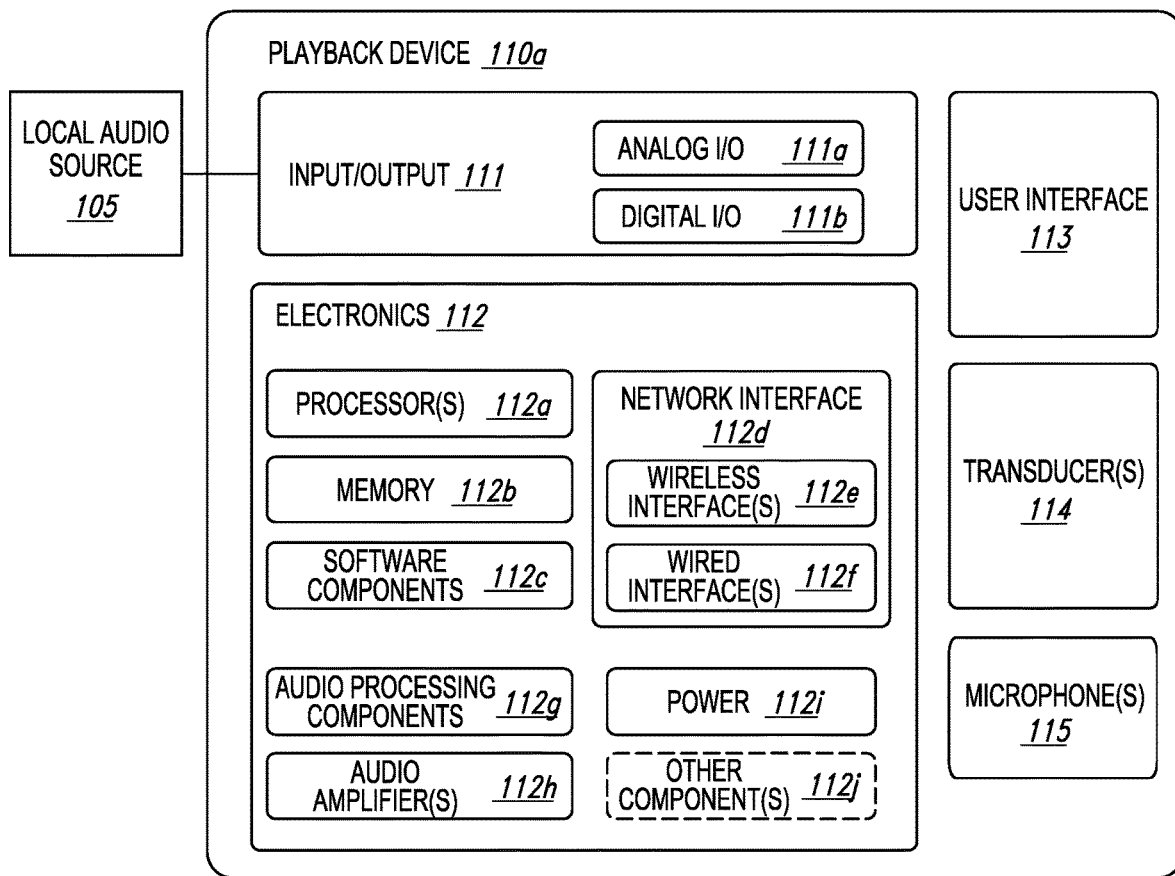
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
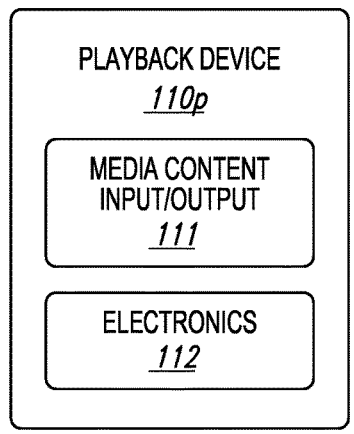
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
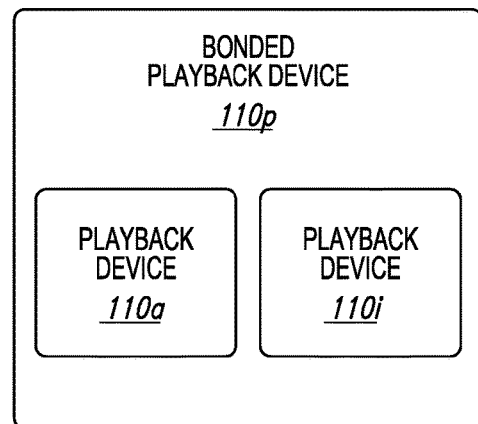
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad'), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 2A-2D and 3.

III. Example Systems and Devices

Figure 2A:
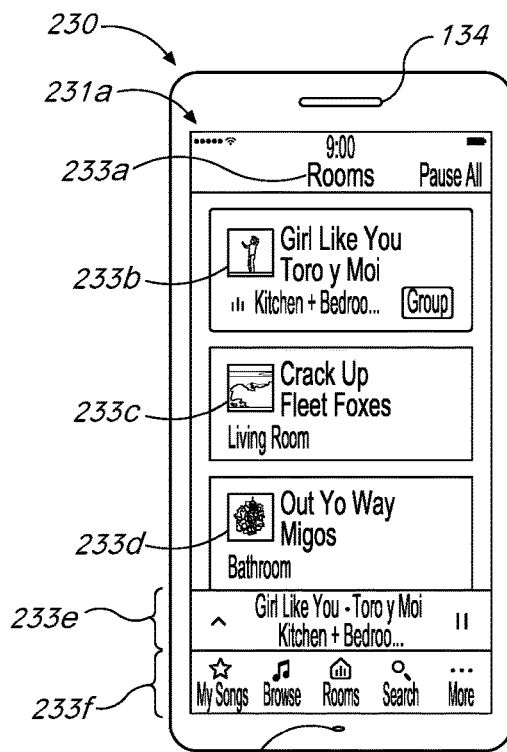
FIGS. 2A-2D are schematic diagrams of a control device in various stages of operation in accordance with aspects of the disclosed technology.
Figure 2B:
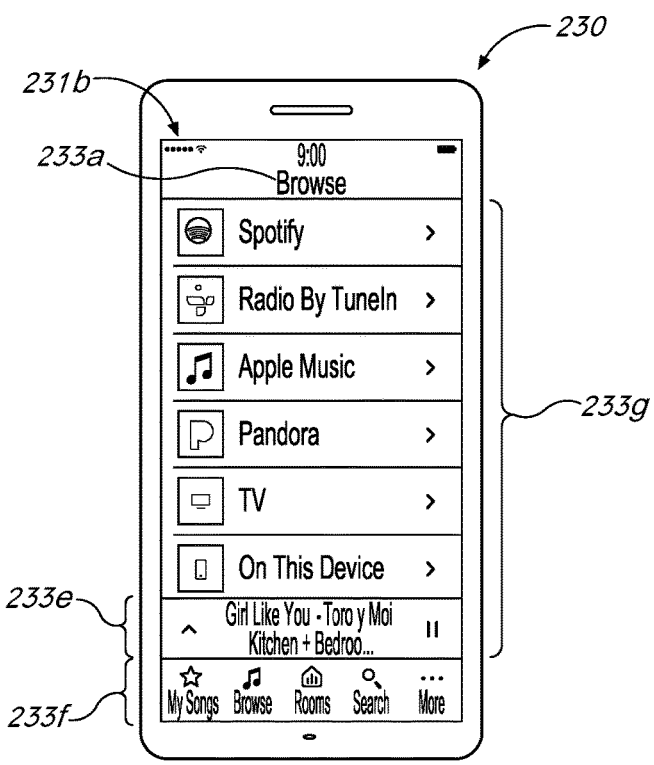
Figure 2C:
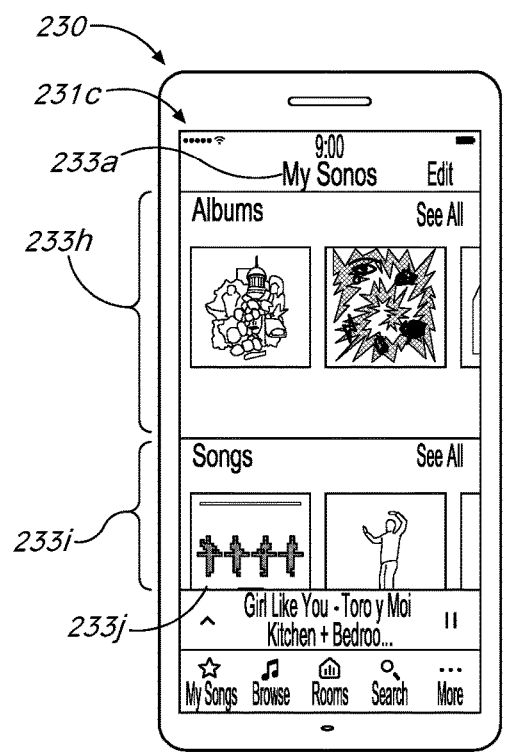
Figure 2D:
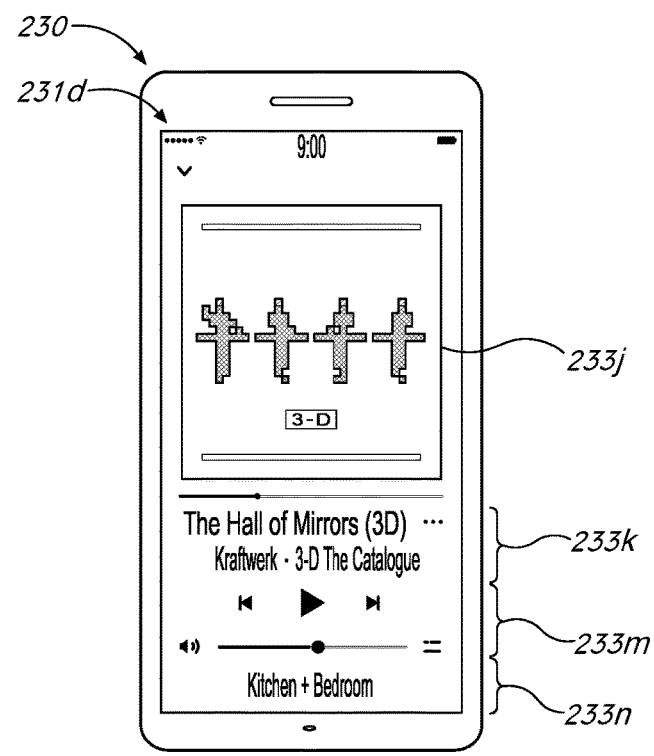

FIGS. 2A-2D are schematic diagrams of a control device 230 (e.g., the control device 130a of FIG. 1H, a smartphone, a tablet, a dedicated control device, an IoT device, and/or another suitable device) showing corresponding user interface displays in various states of operation. A first user interface display 231a (FIG. 2A) includes a display name 233a (i.e., "Rooms"). A selected group region 233b displays audio content information (e.g., artist name, track name, album art) of audio content played back in the selected group and/or zone. Group regions 233c and 233d display corresponding group and/or zone name, and audio content information audio content played back or next in a playback queue of the respective group or zone. An audio content region 233e includes information related to audio content in the selected group and/or zone (i.e., the group and/or zone indicated in the selected group region 233b). A lower display region 233f is configured to receive touch input to display one or more other user interface displays. For example, if a user selects "Browse" in the lower display region 233f, the control device 230 can be configured to output a second user interface display 231b (FIG. 2B) comprising a plurality of music services 233g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 233f, the control device 230 can be configured to output a third user interface display 231c (FIG. 2C). A first media content region 233h can include graphical representations (e.g., album art) corresponding to individual albums, stations, or playlists. A second media content region 233i can include graphical representations (e.g., album art) corresponding to individual songs, tracks, or other media content. If the user selections a graphical representation 233j (FIG. 2C), the control device 230 can be configured to begin play back of audio content corresponding to the graphical representation 233j and output a fourth user interface display 231d fourth user interface display 231d includes an enlarged version of the graphical representation 233j, media content information 233k (e.g., track name, artist, album), transport controls 233m (e.g., play, previous, next, pause, volume), and indication 233n of the currently selected group and/or zone name.

Figure 3:
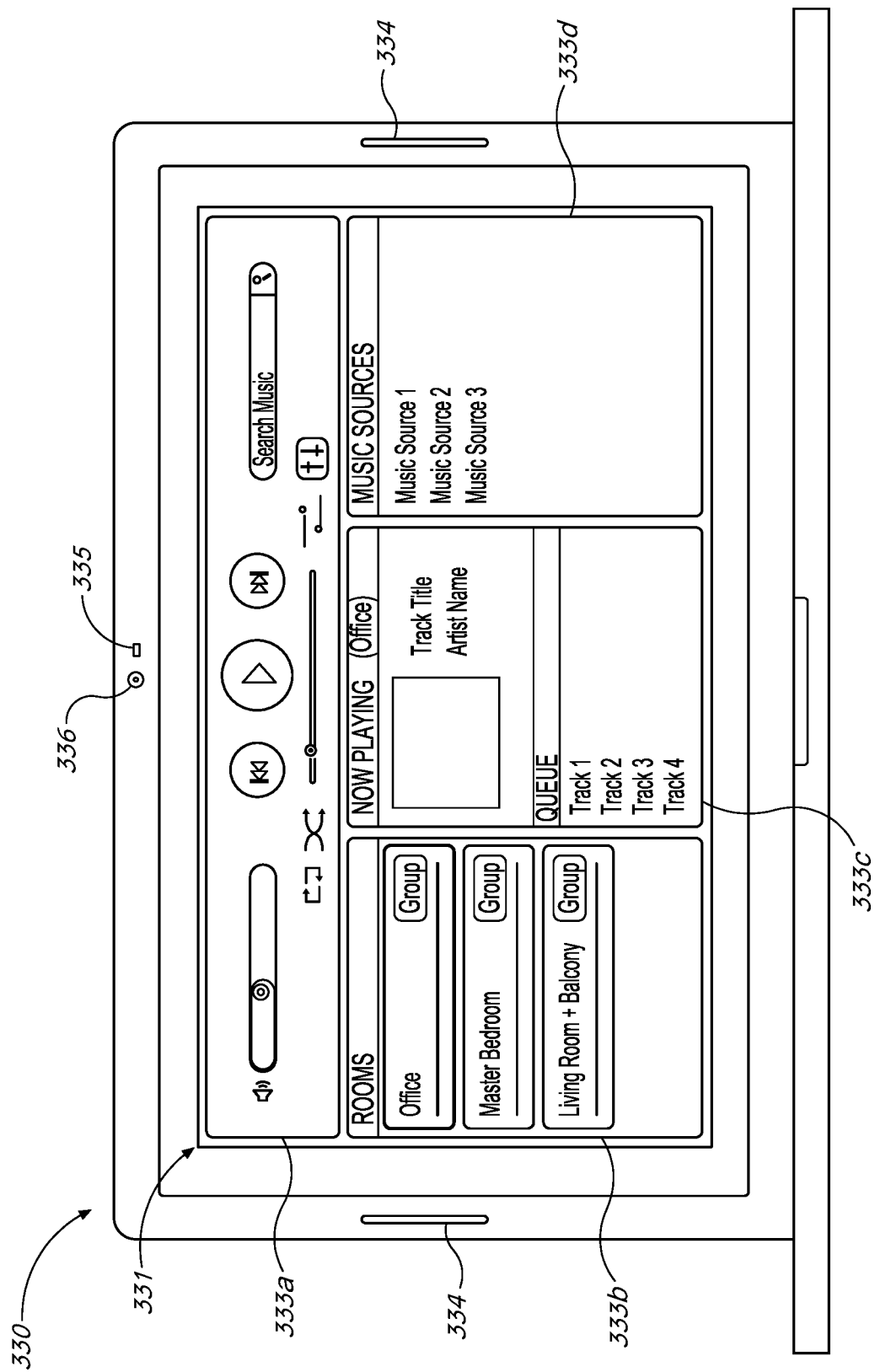
FIG. 3 is a front view of a control device.

FIG. 3 is a schematic diagram of a control device 330 (e.g., a laptop computer, a desktop computer). The control device 330 includes transducers 334, a microphone 335, and a camera 336. A user interface 331 includes a transport control region 333a, a playback status region 333b, a playback zone region 333c, a playback queue region 333d, and a media content source region 333e. The transport control region comprises one or more controls for controlling media playback including, for example, volume, previous, play/pause, next, repeat, shuffle, track position, crossfade, equalization, etc. The audio content source region 333e includes a listing of one or more media content sources from which a user can select media items for play back and/or adding to a playback queue.

The playback zone region 333b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 330 includes other interactions and implementations for grouping and ungrouping zones via the user interface 331. In certain embodiments, the representations of playback zones in the playback zone region 333b can be dynamically updated as playback zone or zone group configurations are modified.

The playback status region 333c includes graphical representations of audio content that is presently being played, previously played, or scheduled to play next in the selected playback zone or zone group. The selected playback zone or zone group may be visually distinguished on the user interface, such as within the playback zone region 333b and/or the playback queue region 333d. The graphical representations may include track title, artist name, album name, album year, track length, and other relevant information that may be useful for the user to know when controlling the media playback system 100 via the user interface 331.

The playback queue region 333d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 4:
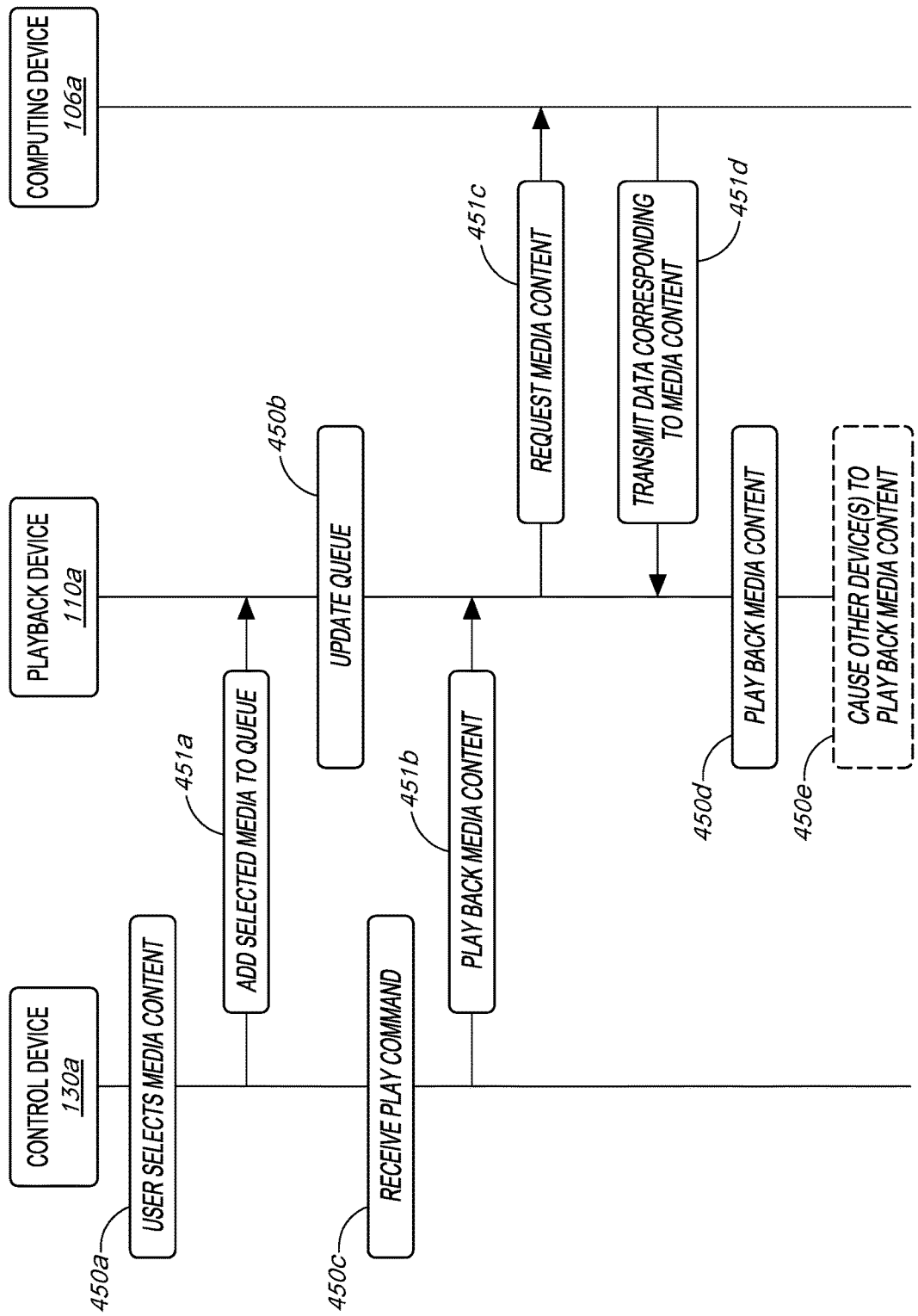
FIG. 4 is a message flow diagram of a media playback system.

FIG. 4 is a message flow diagram illustrating data exchanges between devices of the media playback system 100 (FIGS. 1A-1H).

At step 450a, the media playback system 100 receives an indication of selected media content (e.g., one or more songs, albums, playlists, podcasts, videos, stations) via the control device 130a. The selected media content can comprise, for example, media items stored locally on one or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 451a to the playback device 110a (FIGS. 1A-1C) to add the selected media content to a playback queue on the playback device 110a.

At step 450b, the playback device 110a receives the message 451a and adds the selected media content to the playback queue for play back.

At step 450c, the control device 130a receives input corresponding to a command to play back the selected media content. In response to receiving the input corresponding to the command to play back the selected media content, the control device 130a transmits a message 451b to the playback device 110a causing the playback device 110a to play back the selected media content. In response to receiving the message 451b, the playback device 110a transmits a message 451c to the computing device 106a requesting the selected media content. The computing device 106a, in response to receiving the message 451c, transmits a message 451d comprising data (e.g., audio data, video data, a URL, a URI) corresponding to the requested media content.

At step 450d, the playback device 110a receives the message 451d with the data corresponding to the requested media content and plays back the associated media content.

At step 450e, the playback device 110a optionally causes one or more other devices to play back the selected media content. In one example, the playback device 110a is one of a bonded zone of two or more players. The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Example API for Browsing Media Content

A. Example Display Using the API for Browsing Media Content

Figure 5:
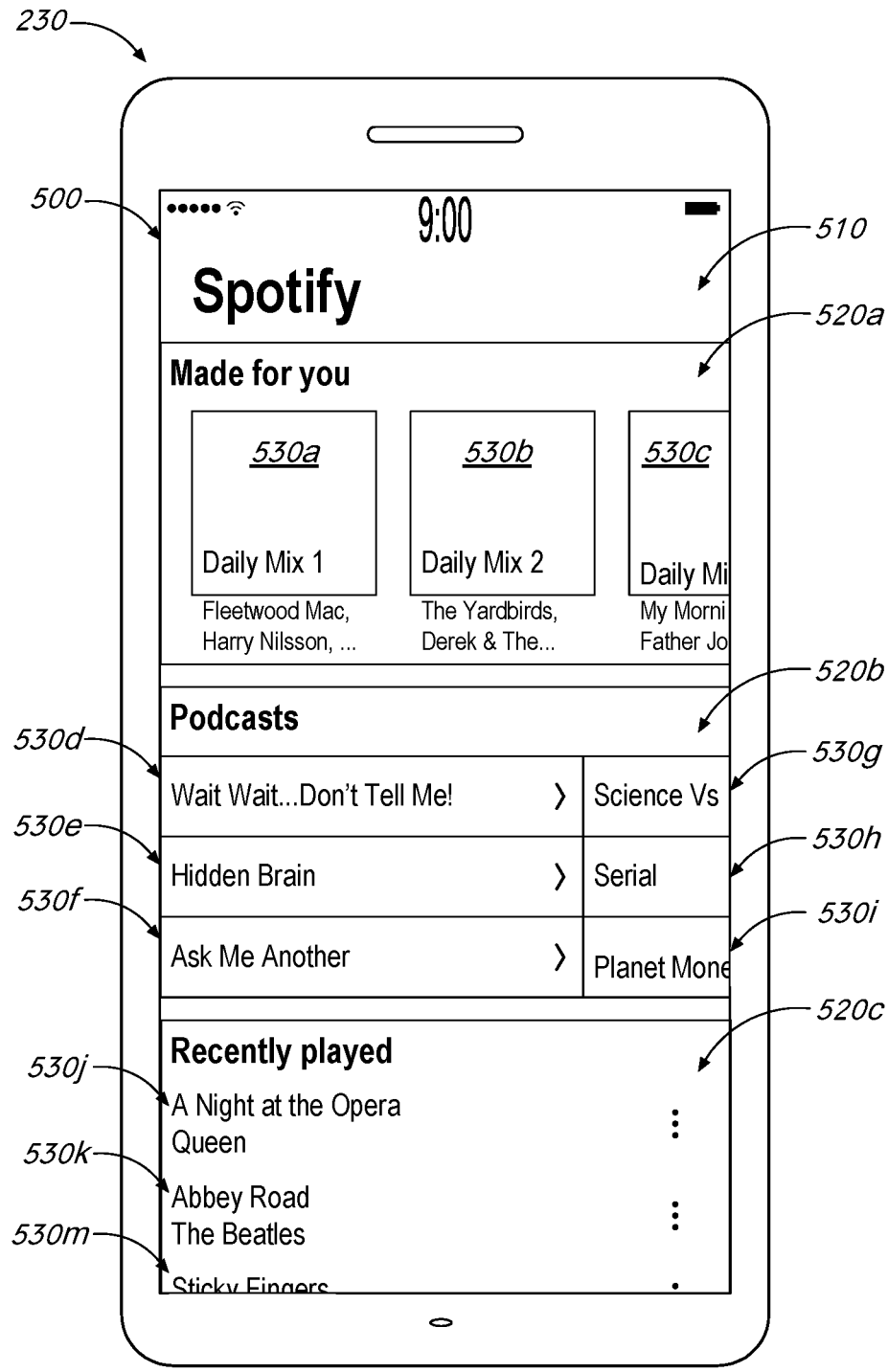
FIG. 5 is a schematic diagram of a control device displaying a browse page.

FIG. 5 is a schematic diagram of the control device 230 showing a user interface display 500 for browsing media content available for playback from a media streaming service. The present example illustrates and describes the display 500 as a display for browsing media content from Spotify, but this is not meant to be limiting, as the following teachings can be applied in connection with various other media streaming services as well.

As shown, the display 500 includes a page 510. The page 510 includes various page elements 520a, 520b, 520c (identified collectively as page elements 520), which are also referred to herein as "views" 520. Each view then includes various media content data 530a-m (identified collectively as media content data 530), also referred to herein as "items" 530. In FIG. 5, view 520a includes items 530a-c, view 520b includes items 530d-i, and view 520c includes items 530j-m. The page 510 can include additional views 520 and items 530 as well. For instance, the page 510 can include views 520 that are not currently displayed on the page 510, but that can be displayed by scrolling through, or otherwise interacting with, the page 510. Likewise, each view 520 can include items 530 that are not currently displayed on the views 520, but that can be displayed by scrolling through, or otherwise interacting with, the views 520.

When providing the display 500, the control device 230 can separately provide the page 510, the views 520, and the items 530 by asynchronously receiving and processing their respective data. In some examples, for instance, when initially generating the display 500, the control device 230 receives data associated with the page 510, a subset of the views 520, and a subset of the items 530 associated with each view 520 of the subset of views.

The subset of the views 520 and the subset of the items 530 can be selected to include at least the views 520 and items 530 that can fit within the bounds of the currently displayed page 510. For instance, the page 510 can include any number of views 520, and the views 520 can include any number of items 530, but only a subset of those views 520 and items 530 can be displayed on the page 510 at any given time. With respect to FIG. 5, the views 520 and items 530 currently displayed on the page 510 include views 520a-c and items 530a-m. As such, the control device 230 can initially receive data associated with views 520a-c and items 530a-m and use that data to output the display 500 shown in FIG. 5 without receiving data associated with other views 520 or items 530 that are not currently displayed on the display 500.

Then, in response to a user interaction with the display 500, such as a scroll input to scroll vertically on the page 510 or to scroll horizontally or vertically within a particular view 520, the control device 230 can retrieve additional data associated with the views 520 and/or items 530 that the user is attempting to bring into view on the display 500.

As discussed above, receiving and processing data for subsets of views 520 and items 530 of the page 510, rather than for all views 520 and items 530, can reduce the amount of data transferred between the media streaming service and the control device 230. Further, by arranging the data in a hierarchical tier format that includes a page level, a view level, and an item level, the control device 230 can apply tier-level formatting rules for displaying the data in various predefined manners at each tier. To provide this functionality, the control device 230 operates according to an API, which is described in further detail below.

B. Example API

The functionality of the API will be described in connection with the display 500 shown in FIG. 5, but other example functionalities will be apparent from the present disclosure as well.

FIGS. 6A through 6C depict example code that the control device 530 receives from a media streaming service, such as Spotify. The control device 530 can request the code from the streaming service, such as by sending a GET request to the streaming service, and the streaming service can provide the code in response to the request. In some examples, the control device 530 requests the code in response to receiving a user input, such as a user input representing a selection of the streaming service. For instance, the control device 530 can send the request to Spotify in response to receiving a selection of the Spotify icon in the user interface display 231b depicted in FIG. 2B.

The code received from the streaming service can include page code, view code, and item code. FIG. 6A depicts example page code 610 that the control device 230 can receive from the media streaming service. The page code 610 includes a page object identifier 612, a page format identifier 614, and page content data 616. As discussed above in connection with FIG. 5, in the present example, the displayed page 510 is the root browse page that is initially displayed when the user chooses to browse streamable content from Spotify. As such, the page object identifier 612 in the present example identifies the page 510 as "browse: page:rootBrowse," and the control device 230 can use this page object identifier 612 when requesting the page code 610 from Spotify. However, the control device 230 can retrieve other pages from Spotify or other streaming services, such as a page that the user navigates to from the root browse page.

The page content data 616 identifies various data that the control device 230 can display on the page 510. In the present example, the page content data 616 includes a container named "Spotify" having a data type specified as "container." A container can be any data object capable of containing one or more other data objects. For instance, in the context of streaming media, a container can be an album that includes one or more music tracks. Or, as in the present example, a container can be a page object that includes one or more views 520 and their respective items 530.

The page format identifier 614 identifies various formatting rules for how the page content data 616 is to be formatted on the displayed page 510. For example, the control device 230 can store one or more configuration files that associate predetermined formatting rules with respective format identifiers. The control device 230 can map the specified page format identifier 614 to the associated formatting rules in the configuration file(s) to determine the formatting rules for the page 510. And the control device 230 can display the content data 616 on the page 510 according to the determined formatting rules.

FIG. 7 depicts an example configuration file 700 that specifies various formatting rules. In the present example, the page code 610 specifies the page format identifier 614 to be "rootBrowsePage," so the control device 230 determines the applicable formatting rules as those associated with the "rootBrowsePage" format identifier. Namely, the control device 230 determines the formatting rules to include displaying a single line of data that corresponds to the specified container name, which in this case is the text "Spotify."

In some examples, the configuration file 700 can specify additional formatting rules, such as font and typeface rules. Alternatively, the control device 230 can be configured to apply default formatting rules based on the type of the data. For instance, the control device 230 can apply one set of default formatting rules to container data objects and another set of default formatting rules to other data objects.

Referring back to FIG. 6A, the page code 610 additionally includes view code and item code corresponding to one or more views 520 and items 530 to be displayed on the page 510.

FIG. 6B depicts example view code 620 that can be included in the page code 610. The view code 620 specifies a total number of views 622 that are represented by the view code 620. In the present example, the view code 620 specifies ten total views. For each view, the view code 620 then specifies a view object identifier 624, a view format identifier 626, and view content data 628.

The control device 230 treats the view object identifier 624, view format identifier 626, and view content data 628 in a similar manner as the page object identifier 612, page format identifier 614, and page content data 616. Namely, the control device 230 can use the view object identifier 624 to identify this particular view when requesting data from the streaming service, the control device 230 can use the view format identifier 626 to determine a set of formatting rules for this view (e.g., using the configuration file 700), and the control device 230 can display the view content data 628 on the page 510 according to the determined set of formatting rules.

In the present example, the first view of the ten total views is a container named "Made for you," and the formatting rules associated with the view format identifier 626 specify displaying a single line of data that corresponds to the container name. Accordingly, as shown in FIG. 5, the control device 530 displays the text "Made for you" in view 520*a* on the page 510.

In some examples, the formatting rules associated with the view format identifier 626 further specify how to format items within the view 520*a*. For instance, the formatting rules can specify arranging the items in a list, grid, table, or text block format. View 520*a* shows items 530*a-c* arranged in a single row grid format, which is also referred to as a horizontal swimlane format. View 520*b* shows items 530*d-i* arranged in a table format. View 520*c* shows items 530*j-m* arranged in a list format. While the view format identifier 626 can specify how the items 530 are arranged within the views 520, the control device 230 relies on separate item code when determining the actual content to display in connection with the items 530, as will be explained in further detail below in connection with FIG. 6C.

Referring back to FIG. 6B, the view code 620 can further include refresh timing data 630. The refresh timing data 630 can specify an expiration time associated with a particular view, and upon expiration the client device 230 can send a request to the streaming service for updated data associated with that view. This allows the streaming service to control how often the control device 230 pings its servers with data requests. Further, by controlling the requests on a per view basis, the streaming service can tailor the data request timings based on the type of data associated with a given view. For instance, if a view includes data that is frequently changing, such as data corresponding to recently played media items, then the streaming service can specify a shorter expiration time than for views that include data that does not frequently change.

The view code 620 additionally includes item code corresponding to the items to be displayed in each of the views 520 on the page 510. Further, while FIG. 6B only shows the portion of the view code 620 corresponding to view 520*a*, the view code 620 also includes view code corresponding to the remaining views 520, including view 520*b* and view 520*c*.

FIG. 6C depicts example item code 640 that can be included in the view code 620. Specifically, FIG. 6C depicts a portion of the item code 640 that corresponds to items 530*a-b*, which are included in view 520*a*. Similar to the view code 620, the item code 640 specifies a total number of items 642 that are represented by the view code 640. In the present example, the item code 640 specifies five total items. For each item, the item code 640 then specifies an item object identifier 644, an item format identifier 646, and item content data 648.

The control device 230 treats the item object identifier 644, item format identifier 646, and item content data 648 in a similar manner as the page object identifier 612, view object identifier 624, page format identifier 614, view format identifier 626, page content data 616, and view content data 628. Namely, the control device 230 can use the item object identifier 644 to identify this particular item when requesting data from the streaming service, the control device 230 can use the item format identifier 646 to determine a set of formatting rules for this item (e.g., using the configuration file 700), and the control device 230 can display the item content data 648 on the page 510 according to the determined set of formatting rules.

In the present example, the first item of the five total items is a container of type "album" with a name "Daily Mix 1" and specified artists named "Fleetwood Mac, Harry Nilsson, and more." Referring to FIG. 7, the formatting rules associated with the item format identifier 646 specify displaying a first line of data that corresponds to the container name and a second line of data that corresponds to the artist name of the container. Accordingly, as shown in FIG. 5, when displaying item 530*a*, the control device 230 displays the text "Daily Mix 1" on a first line and the text "Fleetwood Mac, Harry Nilsson, and more" on a second line in view 520*a* on the page 510. A similar treatment of the portion of the item code corresponding to item 530*b* results in the control device 230 displaying the text "Daily Mix 2" on a first line and the text "The Yardbirds, Derek & The Dominos, and more" on a second line in view 520*a* on the page 510. Further, as noted above, the control device 230 displays items 530*a* and 530*b* in a grid or horizontal swimlane format based on the view format identifier 626 associated with view 520*a*.

While not depicted in FIG. 6C, the item code 640 can further include refresh timing data for some or all of the items 530. The control device 230 can use the refresh timing data in a similar manner as described above. Namely, the refresh timing data can specify an expiration time associated with a particular item, and upon expiration the client device 230 can send a request to the streaming service for updated data associated with that item.

As noted above, one benefit of the API described herein is that the control device 230 can reduce the amount of data transferred between the client device 230 and the streaming service by only requesting and receiving portions of the total available data. For instance, the control device 230 can request and display data for a subset of the views 520 rather than for all of the views 520.

Figure 8:
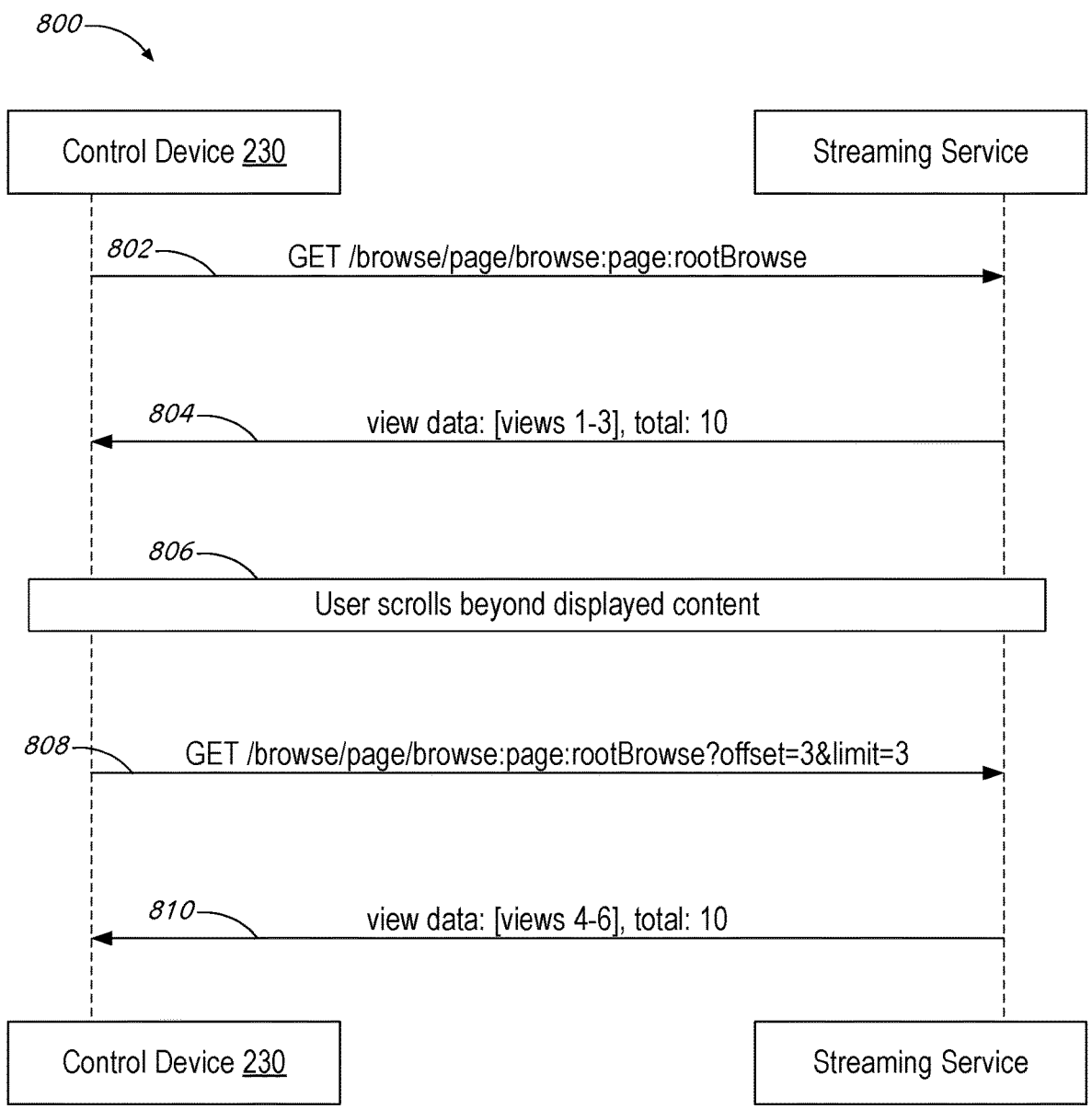
FIG. 8 is a message flow diagram between a control device and a media streaming service.

FIG. 8 depicts a message flow diagram illustrating how the client device 230 can request and receive portions of the total available data from a streaming service. At step 802, the client device 230 sends an initial data request to the streaming service for data for a particular page. At step 804, the streaming service responds by providing page data that includes view data for a subset of the total views of the page. As shown, the requested page includes ten total views, and the streaming service only provides data for three of those views. The control device 230 then uses the view data (which also includes corresponding item data) to display three corresponding views on the page.

At step 806, a user attempts to scroll beyond the displayed content by scrolling beyond the three displayed views. However, the control device 230 does not have any additional view data for displaying additional views on the page, but the control device 230 determines that additional views are available because the previously received view data specified ten total views. As such, in response to the user's scroll input, the control device 230 sends a subsequent request to the streaming service at step 808 for view data for three additional views. And at step 810, the streaming service response by providing the view data for the three additional views. This process can repeat until the control device 230 has received view data for all ten views from the streaming service.

In some examples, a user can fast-scroll to a particular view, skipping over a number of views between the last displayed view and the view that the user scrolls to. For instance, at step 806, the user can fast-scroll from view 3 to view 7, skipping over views 4-6. In this scenario, it can be advantageous to avoid retrieving the view data associated with views 4-6, as the control device 230 will not display these skipped views to the user. To address this, the control device can determine at step 806 that the user has scrolled to a particular view, and the control device can adjust the offset value in step 808 to account for this scrolling. For instance, continuing with the present example, the control device 230 can determine that the user has fast-scrolled from view 3 to view 7, skipping over three views (i.e., views 4-6), and so the control device 230 can increase the offset value at step 808 by three to avoid retrieving data for these three skipped views (i.e., such that the new offset value is equal to 6).

Additionally, the process depicted in FIG. 8 can be applied in connection with item data as well. For instance, referring to FIG. 5, the streaming service can initially provide the control device 230 with item data for items 530a-c of view 520a. Then, when a user attempts to scroll beyond items 530a-c within view 520a, the control device 530 can send a request for additional item data associated with view 520a. Again, this process can repeat until the control device 230 has received item data for all items associated with view 520a.

Figure 9:
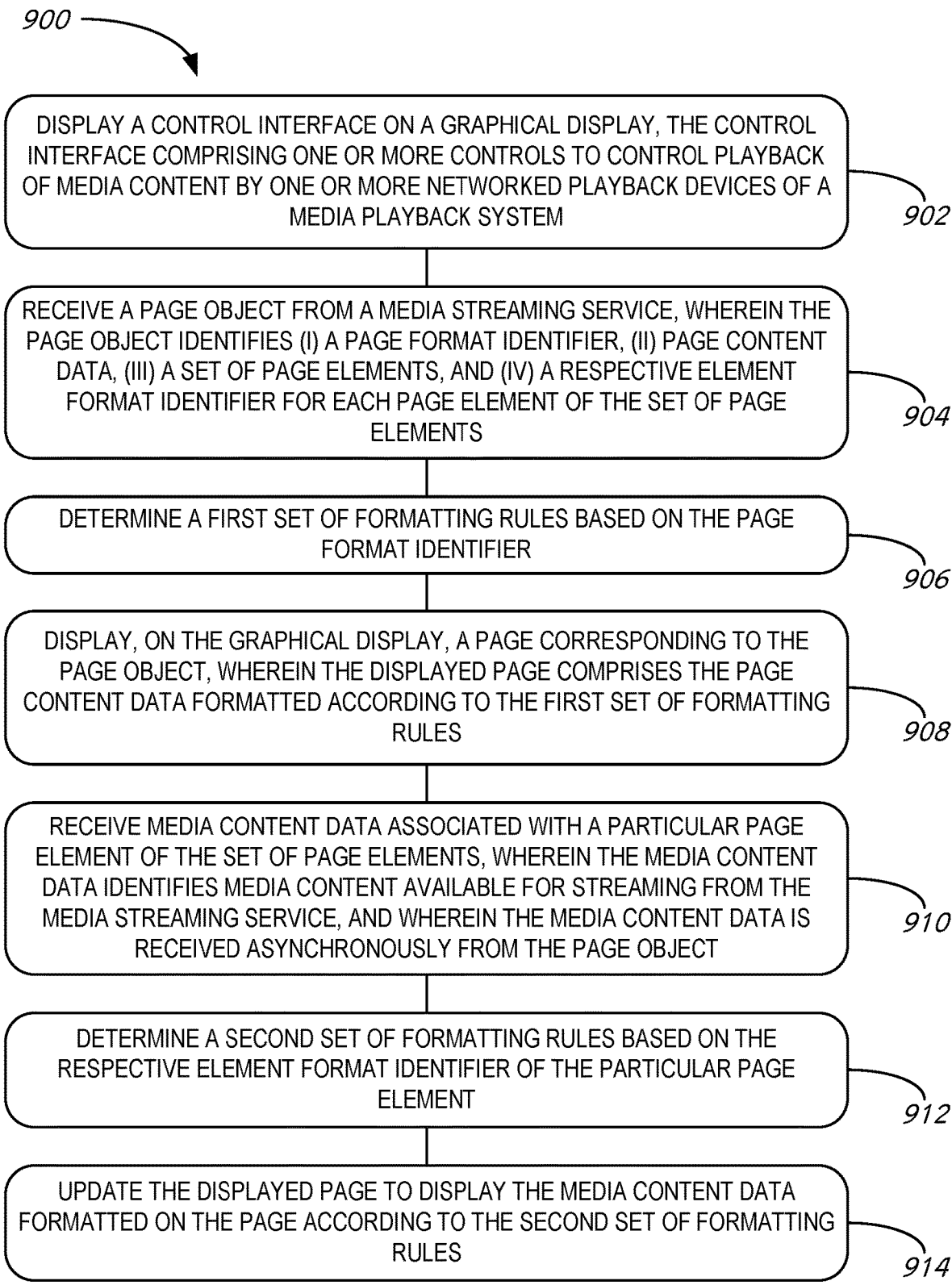
FIG. 9 is a flowchart of a method.

FIG. 9 shows an example method 900 for displaying a page for browsing media content available for streaming from a media streaming service, for instance as described above in connection with FIGS. 5-8. Method 900 can be implemented by any of the control devices described herein, or any other control devices now known or later developed. Further, method 900 can be performed partially or entirely by a control application running on a control device, the control application being configured to control playback of media content by one or more networked playback devices of a media playback system, such as those described herein.

Various embodiments of method 900 include one or more operations, functions, and actions illustrated by blocks 902 through 914. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 900 and for other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and for other processes and methods disclosed herein, each block in FIG. 9 may represent circuitry that is wired to perform the specific logical functions in the process.

Method 900 begins at block 902, which involves displaying a control interface on a graphical display, the control interface comprising one or more controls to control playback of media content by one or more networked playback devices of the media playback system. For instance, a control application of a control device can display a control interface according to the processes described above in connection with FIGS. 2A through 2D.

At block 904, method 900 involves receiving a page object from a media streaming service, wherein the page object identifies (i) a page format identifier, (ii) page content data, (iii) a set of page elements, and (iv) a respective element format identifier for each page element of the set of page elements. An example of the page object is the page code 610, view code 620, and item code 640 described above in connection with FIGS. 6A through 6C. In this example, the page format identifier includes page format identifier 614, the page content data includes page content data 616, the set of page elements includes view code 620 for at least a subset of the total views identified by view code 620, and the respective element format identifiers include view format identifier 626.

At block 906, method 900 involves determining a first set of formatting rules based on the page format identifier. In line with the discussion above, this can involve accessing a configuration file, such as configuration file 700 described above in connection with FIG. 7, stored in a data storage of the control device. The configuration file can associate a plurality of sets of formatting rules with a plurality of identifiers. The plurality of sets of formatting rules can include the first set of formatting rules, and determining the first set of formatting rules can involve determining that the first set of formatting rules is associated with the page format identifier in the configuration file.

At block 908, method 900 involves displaying, on the graphical display, a page corresponding to the page object, wherein the displayed page comprises the page content data formatted according to the first set of formatting rules. As described above in connection with FIGS. 5 through 7, an example of this step involves displaying the container name "Spotify" on page 510.

At block 910, method 900 involves receiving media content data associated with a particular page element of the set of page elements, wherein the media content data identifies media content available for streaming from the media streaming service, and wherein the controller application receives the media content data asynchronously from the page object. An example of the media content data is the item content data 648 described above in connection with FIG. 6C or any other item content data associated with any of the views 520 available for display on the page 510.

At block 912, method 900 involves determining a second set of formatting rules based on the respective element format identifier of the particular page element. In line with the discussion above, this can involve accessing a configuration file, such as configuration file 700 described above in connection with FIG. 7, stored in a data storage of the control device. The configuration file can associate a plurality of sets of formatting rules with a plurality of identifiers. The plurality of sets of formatting rules can include the second set of formatting rules, and determining the second set of formatting rules can involve determining that the second set of formatting rules is associated with the respective element format identifier in the configuration file.

At block 914, method 900 involves updating the displayed page to display the media content data formatted on the page according to the second set of formatting rules. As described above in connection with FIGS. 5 through 7, an example of this step involves updating page 510 to display any of the items 530 within any of the views 520. In some examples, displaying the media content data formatted on the page according to the second set of formatting rules involves displaying the media content data in a list, grid, table, or text block format.

In some examples, receiving the page object from the media streaming service involves (i) receiving user input representing a selection of the media streaming service, (ii) responsive to receiving the user input representing the selection of the media streaming service, sending a request to the media streaming service for the page object, and (iii) responsive to sending the request to the streaming service, receiving the page object from the media streaming service.

In some examples, receiving the media content data associated with the particular page element involves (i) sending a request to the media streaming service for the media content data associated with the particular page element, and (ii) responsive to sending the request to the media streaming service, receiving the media content data associated with the particular page element from the media streaming service.

In some examples, sending the request to the media streaming service for the media content data associated with the particular page element involves (i) identifying a subset of page elements from among the set of page elements, and (ii) sending a request to the media streaming service for media content associated with each page element of the identified subset.

In some examples, identifying the subset of page elements from among the set of page elements involves (i) receiving a user input representing a request to view additional content, and (ii) responsive to receiving the user input, identifying as the subset of page elements a predetermined number of page elements that are not currently displayed on the page. In these examples, receiving the user input can involve receiving a scroll input representing a request to scroll the displayed page beyond the page elements that are currently displayed on the page. Additionally, the scroll input can include a request to scroll the displayed page beyond both (i) the page elements that are currently displayed on the page and (ii) one or more page elements that are not currently displayed on the page, as described above in terms of a "fast-scroll." In these examples, the predetermined number of page elements identified as the subset of page elements can be a predetermined number of page elements sequentially after the one or more page elements that are not currently displayed on the page.

In some examples, the page object further identifies refresh timing data for the particular page element, and method 900 further involves (i) determining, based on the refresh timing data, when to perform a refresh process for updating the media content data associated with a particular page element, and (ii) performing the refresh process by (a) sending a request to the media streaming service for updated media content data associated with the particular page element, and (b) responsive to sending the request to the media streaming service, receiving the updated media content data associated with the particular page element.

In some examples, the media content data identifies media content available for playback on the one or more networked playback devices. In particular, the identified media content can include (i) one or more media tracks or (ii) one or more media containers that contain one or more media tracks. Further, the media content data can include one or more of a title, artist, or album associated with the one or more media tracks or containers.

In some examples, method 900 further involves (i) receiving user input representing a selection of the displayed media content data, and (ii) responsive to receiving the selection, causing the one or more networked playback devices to retrieve, from the media streaming service, media content corresponding to the selected media content data for playback. In these examples, method 900 can further involve updating the displayed page to display one or more transport controls for controlling playback of the media content by the one or more networked playback devices.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. Tangible, non-transitory computer-readable media comprising program instructions stored therein, wherein the program instructions, when executed by one or more processors, cause a computing system to perform functions comprising:
receiving a page object from a media streaming service, wherein the page object corresponds to a page for controlling playback of media content by one or more networked media devices, and wherein the page object comprises a page format identifier associated with page formatting rules for formatting page elements for display within the page;
receiving a first set of page elements from the media streaming service for display within the page, wherein an individual page element comprises content data associated with media content for playback by the one or more networked media devices;
after receiving the first set of page elements, causing a graphical user interface associated with the computing system to display the first set of page elements within the page according to the page formatting rules associated with the page format identifier;
while the first set of page elements is displayed within the page, receiving a request via the graphical user interface to view additional page elements;
after receiving the request to view additional page elements, requesting a second set of page elements from the media streaming service; and
after requesting the second set of page elements from the media streaming service, receiving the second set of page elements from the media streaming service and causing the graphical user interface to transition from displaying the first set of page elements within the page to displaying the second set of page elements within the page.

2. The tangible, non-transitory computer-readable media of claim 1, wherein a quantity of page elements in the first set of page elements is based on how many page elements can be displayed within the page.

3. The tangible, non-transitory computer-readable media of claim 1, wherein the page is configured to display a plurality of page elements, and wherein a total quantity of page elements in the plurality of page elements is greater than a sum of (i) a quantity page elements in the first set of page elements and (ii) a quantity of page elements in the second set of page elements.

4. The tangible, non-transitory computer-readable media of claim 1, wherein the content data associated with media content for playback by the one or more networked media devices in an individual page element corresponds to one of a Uniform Resource Identifier (URI) or a Uniform Resource Locator (URL) where the media content associated with the content data can be obtained by the one or more networked media devices for playback.

5. The tangible, non-transitory computer-readable media of claim 1, wherein the request to view additional page elements comprises a scroll input received from a user via the graphical user interface, and wherein causing the graphical user interface to transition from displaying the first set of page elements within the page to displaying the second set of page elements within the page comprises causing the first set of page elements and the second set of page elements to scroll within the page based on the scroll input.

6. The tangible, non-transitory computer-readable media of claim 1, wherein causing a graphical user interface associated with the computing system to display the first set of page elements within the page according to the page formatting rules associated with the page format identifier comprises:
looking up the page format identifier in a configuration database at the computing system, wherein the configuration database comprises page formatting rules associated with page format identifiers; and
causing the graphical user interface to display the first set of page elements within the page according to the page formatting rules obtained from the configuration database.

7. The tangible, non-transitory computer-readable media of claim 1, wherein receiving a page object from a media streaming service comprises:
receiving a user selection of the media streaming service via the graphical user interface;
requesting the page object from the media streaming service; and
receiving the page object from the media streaming service after requesting the page object from the media streaming service.

8. The tangible, non-transitory computer-readable media of claim 1, further comprising:
receiving a user selection of a particular page element via the graphical user interface; and
after receiving the user selection of the particular page element, causing the one or more networked playback devices to (i) obtain the media content corresponding to the particular page element from the media streaming service and (ii) play the obtained media content.

9. The tangible, non-transitory computer-readable media of claim 1, wherein causing a graphical user interface associated with the computing system to display the first set of page elements within the page according to the page formatting rules associated with the page format identifier comprises:
causing the graphical user interface to display the first set of page elements in one of a list, grid, table, or text block format.

10. The tangible, non-transitory computer-readable media of claim 1, wherein the media content for playback by the one or more networked media devices comprises at least one of (i) one or more media tracks or (ii) one or more media containers that contain one or more media tracks.

11. A computing device comprising:
one or more processors; and
tangible, non-transitory computer-readable media comprising program instructions executable by the one or more processors such that the computing device is configured to:
receive a page object from a media streaming service, wherein the page object corresponds to a page for controlling playback of media content by one or more networked media devices, and wherein the page object comprises a page format identifier associated with page formatting rules for formatting page elements for display within the page;
receive a first set of page elements from the media streaming service for display within the page, wherein an individual page element comprises content data associated with media content for playback by the one or more networked media devices;

after receiving the first set of page elements, cause a graphical user interface associated with the computing device to display the first set of page elements within the page according to the page formatting rules associated with the page format identifier;

while the first set of page elements is displayed within the page, receive a request via the graphical user interface to view additional page elements;

after receiving the request to view additional page elements, request a second set of page elements from the media streaming service; and after requesting the second set of page elements from the media streaming service, receive the second set of page elements from the media streaming service and cause the graphical user interface to transition from displaying the first set of page elements within the page to displaying the second set of page elements within the page.

12. The computing device of claim 11, wherein a quantity of page elements in the first set of page elements is based on how many page elements can be displayed within the page.

13. The computing device of claim 11, wherein the page is configured to display a plurality of page elements, and wherein a total quantity of page elements in the plurality of page elements is greater than a sum of (i) a quantity page elements in the first set of page elements and (ii) a quantity of page elements in the second set of page elements.

14. The computing device of claim 11, wherein the content data associated with media content for playback by the one or more networked media devices in an individual page element corresponds to one of a Uniform Resource Identifier (URI) or a Uniform Resource Locator (URL) where the media content associated with the content data can be obtained by the one or more networked media devices for playback.

15. The computing device of claim 11, wherein the request to view additional page elements comprises a scroll input received from a user via the graphical user interface, and wherein the program instructions executable by the one or more processors such that the computing device is configured to cause the graphical user interface to transition from displaying the first set of page elements within the page to displaying the second set of page elements within the page comprise program instructions executable by the one or more processors such that the computing device is configured to cause the first set of page elements and the second set of page elements to scroll within the page based on the scroll input.

16. The computing device of claim 11, wherein the program instructions executable by the one or more processors such that the computing device is configured to cause a graphical user interface associated with the computing device to display the first set of page elements within the page according to the page formatting rules associated with the page format identifier comprise program instructions executable by the one or more processors such that the computing device is configured to:

look up the page format identifier in a configuration database at the computing device, wherein the configuration database comprises page formatting rules associated with page format identifiers; and cause the graphical user interface to display the first set of page elements within the page according to the page formatting rules obtained from the configuration database.

17. The computing device of claim 11, wherein the program instructions executable by the one or more processors such that the computing device is configured to receive a page object from a media streaming service comprise program instructions executable by the one or more processors such that the computing device is configured to:

receive a user selection of the media streaming service via the graphical user interface;

request the page object from the media streaming service; and receive the page object from the media streaming service after requesting the page object from the media streaming service.

18. The computing device of claim 11, further comprising program instructions executable by the one or more processors such that the computing device is further configured to:

receive a user selection of a particular page element via the graphical user interface; and after receiving the user selection of the particular page element, cause the one or more networked playback devices to (i) obtain the media content corresponding to the particular page element from the media streaming service and (ii) play the obtained media content.

19. The computing device of claim 11, wherein the program instructions executable by the one or more processors such that the computing device is configured to cause a graphical user interface associated with the computing device to display the first set of page elements within the page according to the page formatting rules associated with the page format identifier comprise program instructions executable by the one or more processors such that the computing device is configured to:

cause the graphical user interface to display the first set of page elements in one of a list, grid, table, or text block format.

20. The computing device of claim 11, wherein the media content for playback by the one or more networked media devices comprises at least one of (i) one or more media tracks or (ii) one or more media containers that contain one or more media tracks.

* * * * *